May 6, 1958 E. H. B. BARTELINK 2,833,850
SUBSCRIBER TELEVISION SYSTEM
Filed April 4, 1952 3 Sheets-Sheet 1
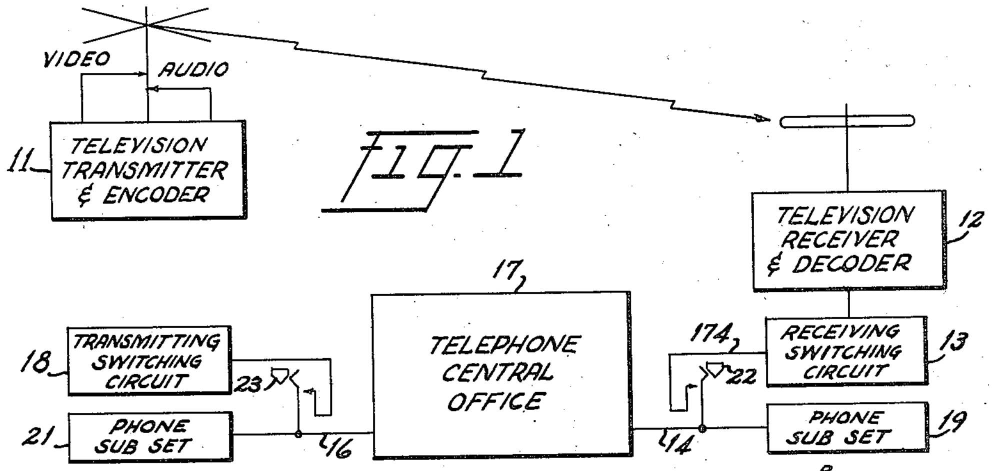
FIG. 1
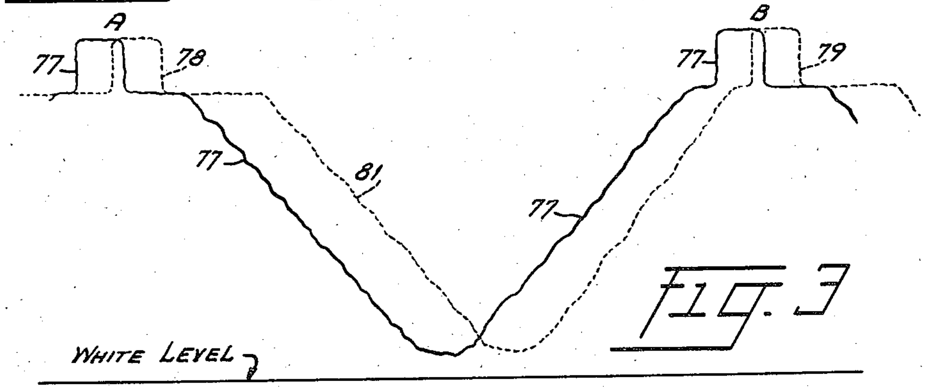
FIG. 3
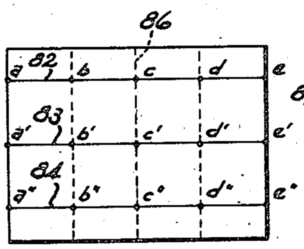
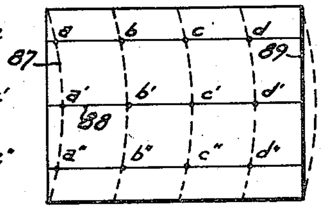
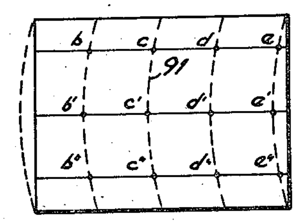
FIG. 4 FIG. 5 FIG. 6
INVENTOR.
EVERHARD H. B. BARTELINK
BY H. L. Mackey
ATTORNEY.

SUBSCRIBER TELEVISION SYSTEM

Filed April 4, 1952 3 Sheets-Sheet 2

INVENTOR.
EVERHARD H.B. BARTELINK

BY H. A. Mackey

ATTORNEY.

SUBSCRIBER TELEVISION SYSTEM

Filed April 4, 1952 3 Sheets-Sheet 3

INVENTOR.
EVERHARD H. B. BARTELINK

BY H. A. Mackey
ATTORNEY.

United States Patent Office 2,833,850

Patented May 6, 1958

2,833,850

SUBSCRIBER TELEVISION SYSTEM

Everhard H. B. Bartelink, Bronxville, N. Y., assignor to General Precision Laboratory Incorporated, a corporation of New York Application April 4, 1952, Serial No. 280,613

2 Claims. (Cl. 178—5.1)

This invention relates to the television art and more particularly to subscriber systems for placing television reception under control of the television transmitting station, by requiring transmission of coded information in addition to the conventional television video and audio signals in order to secure clear reception.

This invention provides a television system so designed that special transmitted signals can be received by special television receivers only after being put into condition for reception by means of coded signals. These signals are of short duration and will be transmitted over a channel separate from the television channels. The signals can be transmitted over any type of channel, for example, over the existing wire telephone facilities or over a private wire which may be rented from a commercial communication company. After the signals have been received at the receiver station, the latter can thereafter receive the special transmitted signals until and unless the code is changed. This system therefore permits establishment of a new method of payment for television service, in which a periodical subscription price can be charged for the service.

Various systems of coding are available in which the coded signals are capable of a number of code changes. The signals can be transmitted by any means, for example, by radio or by wire, or even mechanically in the form of a key similar to the key of a tumbler lock, or in the form of a punched card.

To receivers of the conventional kind or receivers not properly set by the encoded signals, the television signals, although received, will be distorted so that the resulting picture will be too blurred to be usable. In addition, the sound will in general contain a high-pitched whistle which also renders is unusable.

An auxiliary or rephasing signal is also provided by this invention by which additional jumbling of the picture is effected under control of the transmitter operator or under automatic control. The function of this signal is to reverse the phase of the scrambling signal at the transmitter, with simultaneous correction at the coded receivers, so that not only are distorted pictures received, but the phase of the distortion is reversed from time to time, making unauthorized reception on homemade apparatus both more difficult and quite unsatisfactory.

The general purpose of this invention then is to provide a television system having transmitted television signals inherently containing such secrecy provisions as to render clear reception thereof by unauthorized receivers very difficult.

A specific purpose of this invention is to provide a television receiver capable of being adjusted in accordance with a code for reception of signals from a specific television station, the receiver after such adjustment being in condition for reception of the television signals.

A more specific purpose of this invention is to provide a television transmitter, a television receiver capable of being adjusted to receive signals emanating from the transmitter, and a circuit for transmitting electrical signals over wire circuits to accomplish the adjustment of the receiver.

Further understanding of the invention may be secured from the detailed description and the accompanying drawings, in which:

Figure 1 is a schematic diagram of the television system of the invention.

Figures 3 to 6 are graphic illustrations of wave forms and video field distortions produced by the television picture transmitter.

Figure 2:
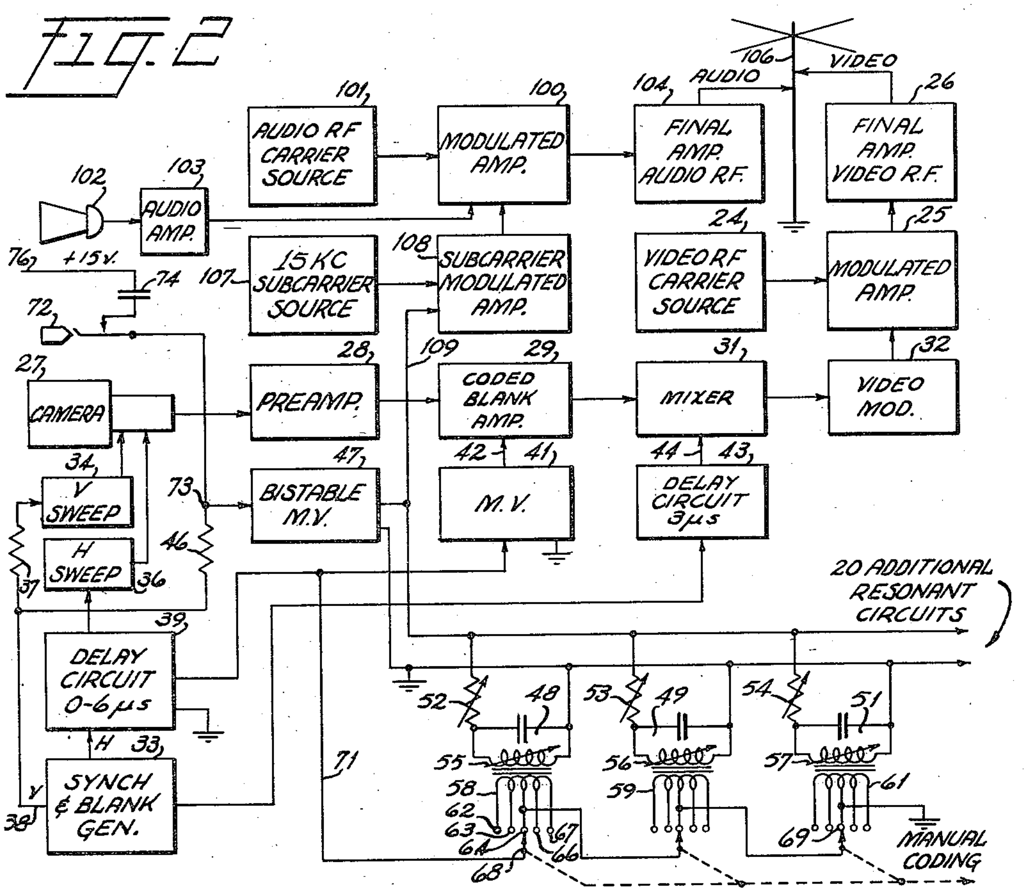
Figure 2 is a schematic diagram of the television picture and audio transmitter and encoder.

Referring now to Fig. 1, a television transmitter and encoder 11 is provided which is conventional in that it employs interlaced fields and standard vertical and horizontal synchronization frequencies. The transmitter, however, departs from the conventional in that its television video output signals are encoded by being systematically distorted according to a selected and changeable plan, so that the picture received by conventional television receivers is so distorted and blurred as to be unusable. The audio modulation emitted by the transmitter contains a high pitched note so that it also may be unsatisfactory to most listeners using conventional receivers. This high pitched note is in addition employed as a subcarrier through which the picture distortion can be phase-inverted at any time, even during a transmission, at the will of the transmitting operator. This further complicates reception by unauthorized listeners, but is instantly and automatically compensated for at receivers designed for the purpose.

Other methods of transmission of the phase inversion signal can be employed, it not being essential to employ the television sound channel for this purpose. For example, a wire channel can be employed, or the information can be sent over the television video transmission channel at times when the channel is not transmitting video information.

The television receiver and decoder 12 differs from conventional receivers in containing resonant circuits controlled by the vertical synchronization pulses to continuously generate decoding wave forms, and in the addition of an extra coil on the picture tube yoke to utilize these wave forms. It also contains an audio filter to segregate the audio subcarrier.

The decoding wave forms are continuously applied to the distorted television signals received from the transmitter, so as to neutralize the distortion, resulting in a normal and undistorted picture. The type of distortion, and the corresponding type of continuous decoder signals for neutralization thereof, may be of a number of varieties, in fact several thousand possible changes may be made in them. These changes are controlled by manual dials at the transmitting station and by the receiving decoder setting. This setting is accomplished in such a way as to insure that the setting of the receiving decoder conforms to the particular setting used at the transmitter. Telegraphic means may be used to correlate the transmitter setting with the central equipment for setting the receiving decoders. It is this setting operation which controls the receiver in a commercial sense, so that payment of a fee can be made a prerequisite to the setting by wire of the receiving decoder.

A receiving switching circuit 13 is associated with the receiver and decoder 12 for the purpose of setting the decoder to agree with the encoder setting.

The transmission line for setting the receiving switching circuit 13 is indicated at 14 and 16. This transmission on line passes through a telephone central office 17 and terminates at the transmitting end in a transmitting switching circuit 18. The "setting" signals are carried by audio frequency carriers suitable for transmission over any commercial telephone line in exactly the same way in which voice is transmitted. At the subscriber's premises receiving and decoding sets 12 and receiving switching circuits 13 are installed, with a switch 22 installed near the subscriber's telephone 19 to bridge the switching circuit 13 across his line in parallel with the telephone 19. The subscriber's telephone set and switch at the code transmitting end are shown at 21 and 23. These switches, which are of the spring-loaded type, are the only apparatus connected into the commercial telephone circuits, except that with these switches there may be associated series resistors and either condensers or a transformer and a condenser to protect the telephone line from undesired effects.

The transmitting switching circuit 18 and its associated telephone subscriber's set 21 need not be physically located near the television transmitter and encoder 11 as indicated in Fig. 1, although this location may be found most convenient. Technically, the television transmitter and encoder 11 is not connected to the transmitting switching circuit 18, its connection into the circuit being solely via the radio link to the television receiver and decoder 12.

The television transmitter is schematically illustrated in Fig. 2. The picture carrier generator is indicated at 24, with the final R. F. amplifier at 26, the frequency being, for example, the carrier frequency for channel 3 or 61.25 mc. p. s. The television camera 27 is connected to the video chain including a preamplifier 28, coded blanking amplifier 29, mixer 31 and final video modulator 32 which modulates amplifier 25. These circuits, together with the synchronizing pulse and blanking signal generator 33 are all conventional circuits well known in the television art.

The camera 27 sweep circuits are controlled by the conventional vertical sweep circuit 34 and horizontal sweep circuit 36, triggered from the synchronizing generator 33. The triggering of the vertical sweep circuit 34 is conventional through resistor 37 and conductor 38, but the horizontal sweep circuit 36 is triggered through a delay circuit 39. This circuit is conventional and consists of a Chance monostable multivibrator containing cathode resistor coupling and in which the time duration of the unstable state, having any value between zero and 6 microseconds ($\mu$s.) is linearly dependent upon the bias voltage applied to one of the control grids. The termination of the unstable state triggers a blocking oscillator which in turn triggers the horizontal sweep generator 36.

A multivibrator blanking gate generator 41 is similar to the delay circuit 39 in that the start of the gate may be delayed by an amount varying from zero to 6 $\mu$s. This generator 41 applies its blanking signal to amplifier 29 through conductors 42. The synchronizing generator 33 also transmits its vertical and horizontal synchronizing signals to a delay circuit 43 which introduced a 3 $\mu$s. constant time delay and applies these signals through conductors 44 to the mixer 31. This delay circuit is conventional and generally similar to the delay circuit 39.

The control voltage for the $\theta$-6 $\mu$s. delay circuit 39 and the delayed blanking circuit 41 is secured as follows. The vertical synchronizing signals impressed on conductor 38, having a frequency of 60 C. P. S. and synchronized with the 60-cycle power circuit, are applied through resistor 46 to a bistable or scale-of-two multivibrator 47. This conventional circuit emits an alternating voltage having a rectangular wave form and a frequency of one-half of that of the signal applied thereto, or 30 C. P. S. A number of resonant circuits tuned to the fundamental and lower odd harmonics of 30 C. P. S. and numbered 48, 49 and 51 are fed in parallel by the multivibrator 47 and are excited by the harmonics contained in the 30 C. P. S. voltage to produce sinusoidal signals having harmonic frequency relations. Any reasonable number of such circuits may be employed as, for instance, circuits tuned to the 1st, 3rd, 5th, 7th, 9th, 11th and 13th harmonics, but here it is sufficient to depict only the first three as examples, each consisting of a capacitor-inductor combination. The strength of excitation and therefore the energy of resonation of each circuit is controlled by a series resistor 52, 53 and 54, and the phase of each relative to that of the rectangular exciting wave is controlled by slightly detuning the resonant circuit. This is most easily accomplished by variation of the inductor, as at 55, 56 and 57. By this means both leading and lagging phase angles can be produced, with at the same time some changes in output power which can be compensated for by adjustment of the resistors 52, 53 and 54. The purpose in providing these installation adjustments is to produce in the output circuit an aggregate wave form having harmonic components that are adjustable in both magnitude and phase.

Each inductor is inductively associated with a secondary winding 58, 59 and 61 which is adjustable. Each secondary winding such as 58 is brought out to five taps 62, 63, 64, 66 and 67 of a tap switch having an arm 68. The center tap of each switch is connected to the adjacent switch arm, putting all outputs in series. When, therefore, the switch arm of a tap switch is on its central tap, its voltage is zero, when on either terminal tap, the output voltage is maximum but the voltages of the two terminals are of opposite phase, and the remaining taps provide half voltage output. The center tap 69 of the secondary coil 61 is grounded while the switch arm 68 is connected through the conductor 71 to delay circuits 39 and 41 as a load to ground. Thus all of the resonant circuit output windings are in series and their outputs combine to form a wave composed of preselected amounts of harmonics and fundamental, the relative strengths and senses of the three sinusoidal components being adjustable by the three tap switches. Since one switch tap produces zero output, any component can be omitted. There are 125 possible adjustment permutations of these switches corresponding to 125 different wave form outputs.

This output wave form constitutes the bias voltage to control the delay of the delay circuits 39 and 41, and because the voltage is synchronous with one-half of the field frequency, every alternate field is delayed according to the same pattern, while the remaining fields are delayed according to a second pattern having 180° phase relation to the first pattern.

A spring-loaded code reversing switch 72 is connected to the input terminal 73 of the bistable multivibrator 47, to connect this point momentarily through a condenser 74, to a source of direct current indicated by the terminal 76. When this switch is operated it connects the condenser 74 to the input of the bistable multivibrator 47, impressing thereon a single sharp pulse in addition to the vertical synchronizing pulses regularly received by it. This steps the multivibrator ahead one-half cycle, thus reversing the 30 C. P. S. output phase and changing the phases of all of the harmonic outputs by a corresponding amount. As the result, the distortions produced in the video fields are transposed. By a method to be described, these distortion transpositions are automatically neutralized in authorized receivers. However, in unauthorized receivers these transpositions constitute another type of coding to be coped with.

In place of the switch 72, occasionally operated, there may be substituted an automatic switch, operated by any suitable timing means. The switch operation may be made frequent and irregular, preferably operated at random intervals during program transitions of, perhaps about one second. Such operation would constitute a potent deterrent to unauthorized operation, for the circumvention of this type of coding necessitates the development of a fairly complex circuit.

The manner in which the transmitter distorts the video picture transmission will now be described. Referring to Fig. 3 two successive horizontal synchronizing pulses, A and B, with the intervening horizontal picture scanning line, are shown as a solid line 77. At the transmitter, however, the horizontal synchronizing pulses are delayed 3 $\mu$s. by the circuit 43, Fig. 2, which delay is represented in Fig. 3 by a shift of these pulses to the right as indicated by the dashed pulses 78 and 79. The picture signal is shifted to the right by a time that varies between zero and 6 $\mu$s. in accordance with the amount of the voltage bias applied through conductor 71 to the delay circuit 39. The 6 $\mu$s. limit is indicated in Fig. 3 by a shift of the picture scan signal to the dotted line position at the right. During one 30 C. P. S. cycle the shift may be between the limits defined by the heavy line 77 and the dotted line 81 and back again.

A conventional picture rectangle is illustrated in Fig. 4 with several horizontal lines shown, line 82 being near the top, line 83 at the middle and line 84 near the bottom. These lines represent the modulated left to right picture traces, starting at *a* at the left margin and continuing to the point *e* at the right. Like letters with or without suitable differentiating superscriptions indicate equal periods of displacement of the horizontal traces. Thus, for example, the dashed straight line 86 connects *c*, *c'* and *c''* at half deflection points of the several horizontal traces.

In Fig. 5 there is illustrated a picture rectangle containing similar raster portions displaced in the manner a signal pattern would appear on a conventional receiver if transmitted by the circuit of Fig. 2. The 3 $\mu$s. horizontal synchronization delay simply delays the start of each horizontal retrace by a slight time so that each horizontal line starts its trace 3 $\mu$s. later.

Let it be supposed that the delay is in the form of a simple 30 C. P. S. sine wave without harmonics and in phase with the field frequency. All horizontal lines will then start later as indicated by the dotted line 87, the center scan 88 being moved to the right by 3 $\mu$s. or about 5⁄58 of the length of a line. The line joining *c*, *c'* and *c''* is no longer straight but is bowed toward the right and parallel with 87. The right edge of the picture is cut off since blanking commences at the right edge 89 of the frame before the terminations of the several horizontal scans. The entire picture image is distorted and curved toward the right like the up-and-down dashed lines. This is the aspect of one field of the transmitted picture as seen on a conventional receiver.

The next field will have the average delay, i. e., 3 $\mu$s. at the top and bottom and the minimum or maximum delay will occur in the middle of the picture height. Its appearance therefore, will be as shown in Fig. 6. Since at the start of the field the scan delay is the same as the horizontal synchronizing delay, the initial picture element will lie at the upper left corner of the frame as before. The initial scan elements of succeeding scans appear to lie off the frame to the left although the start of each horizontal scan does not actually precede in time the start of each synchronizing signal because of the width of the latter and the blanking width, as is clearly shown in Fig. 3. The left edge of the picture is therefore cut off and the picture is bowed to the left as is indicated by line 91 through *c*, *c'* and *c''*.

Thus alternate fields are distorted as indicated in Fig. 5 and the remainder as indicated in Fig. 6. Since interlaced scanning is employed, the alternate lines of the picture are displaced as in Fig. 5 with the remaining lines displaced as in Fig. 6. Thus the picture appears as a double image, each image being distorted and the distortion of each being in opposite directions.

The sound portion of the transmitter includes conventional R. F. carrier source 101, Fig. 2, having a frequency for channel 3 of 65.75 mc. p. s., microphone 102, audio amplifier 103, modulated amplifier 100 and final amplifier 104 feeding an antenna 106 that may be separate from the picture antenna but which in this figure is combined with it, the carrier separation being under present standards 4½ mc. A subcarrier source 107 having a frequency above the normal sound transmission band, for instance, 15 kc., is impressed on a modulator 108, where it is modulated by a 30 C. P. S. signal derived through conductors 109 from the output of the bistable multivibrator 47. In the amplifier 108 this square modulating signal is rounded to a sinusoidal wave. The modulated subcarrier is then applied to the radio frequency amplifier 100 and final stage 104. The subcarrier will exist as a 15 kc. whistle in the speaker output if the set components can transmit that frequency which is at present unlikely, and will be audible to some persons.

Figure 7:
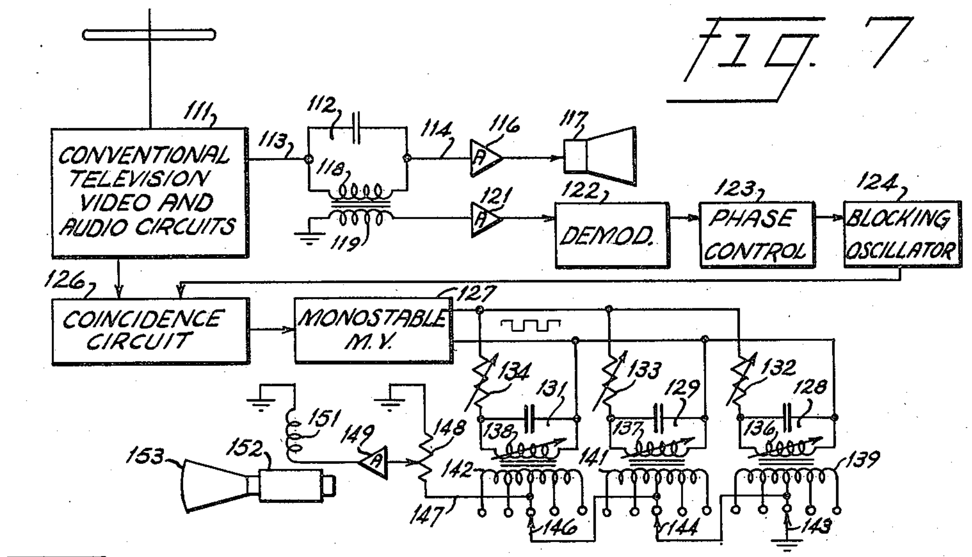
Figure 7 is a schematic diagram of the television picture and sound receiver and decoder.

The conventional television receiver video and audio circuits are indicated at 111 in Fig. 7. The audio frequency signal after demodulation is passed through a 15 kc. filter that may have any conventional form. One such filter as shown consists of a parallel resonant circuit 112 supplied with the demodulated audio energy through conductor 113, permitting all frequencies except 15 kc. to pass through conductor 114 to the final audio amplifier 116 and speaker 117. The inductor 118 is provided with a pick-up coil 119, from which the 15 kc. energy is secured. This energy is amplified by an amplifier 121 and demodulated by a demodulator 122 securing therefrom the 30 C. P. S. sinusoidal modulation signal. This signal is passed through a conventional phasing control 123 by which a change of up to at least 45° can be made in the signal phase, the output of which actuates a blocking oscillator 124.

A conventional coincidence circuit 126 is actuated by 60 C. P. S. vertical synchronizing pulses taken from the television receiver synchronizing separation circuit and is also actuated by the 30 C. P. S. output of the blocking oscillator 124. The output of the coincidence circuit, when properly adjusted is a 30 C. P. S. pulse coincident with every other vertical synchronizing pulse. This 30 C. P. S. pulse is used to trigger a monostable multivibrator 127, its period being so set as to produce an approximately symmetrical 30 C. P. S. rectangular output wave form signal.

This signal is employed to excite several resonant circuits, represented at 128, 129 and 131, tuned to resonate to 30 C. P. S. and to the 3rd and 5th harmonics thereof. Since any errors of adjustment of the multivibrator from symmetry will merely produce even harmonics which cannot affect the resonant circuits, this adjustment need not be highly accurate.

The resonant circuits 128, 129 and 131 are provided with magnitude controls 132, 133 and 134 and phase controls 136, 137 and 138. Each resonant circuit is provided with a secondary coil 139, 141 and 142 and each coil is provided with a 5-point tap switch 143, 144 and 146. The center tap of each switch is connected to the following switch arm so that all secondary coil outputs are in series, with sense and magnitude of output controlled by the switches in exactly the same manner as described in connection with the resonant circuits 48, 49 and 51 of Fig. 2. The switch arm 143 is grounded and the output conductor 147 is connected to energize a potentiometer 148 through which the input to an amplifier 149 can be controlled. The output of the amplifier 149 is applied to a bias winding 151 added to the magnetic deflection yoke of a conventional television tube 152.

In operation of this receiver circuit the phase control 123 is set during installation so that the time phase of the 30 C. P. S. square wave output of the monostable multivibrator 127 is the same as that of the bistable multivibrator 47 (Fig 2) output. The output circuits of the resonant circuits 128, 129 and 131 are set by means of the receiving decoder to have the same settings as the output circuits of Fig. 2, and therefore, the wave form applied to the bias binding 151 is identical with that applied to the delay circuit 39. However, polarities are so arranged that the bias magnitudes applied to the picture tube 152 are in such direction as to neutralize at every instant the distortions contained in the video signals applied thereto with the result that the picture received on the picture tube screen 153 is undistorted.

Figure 8:
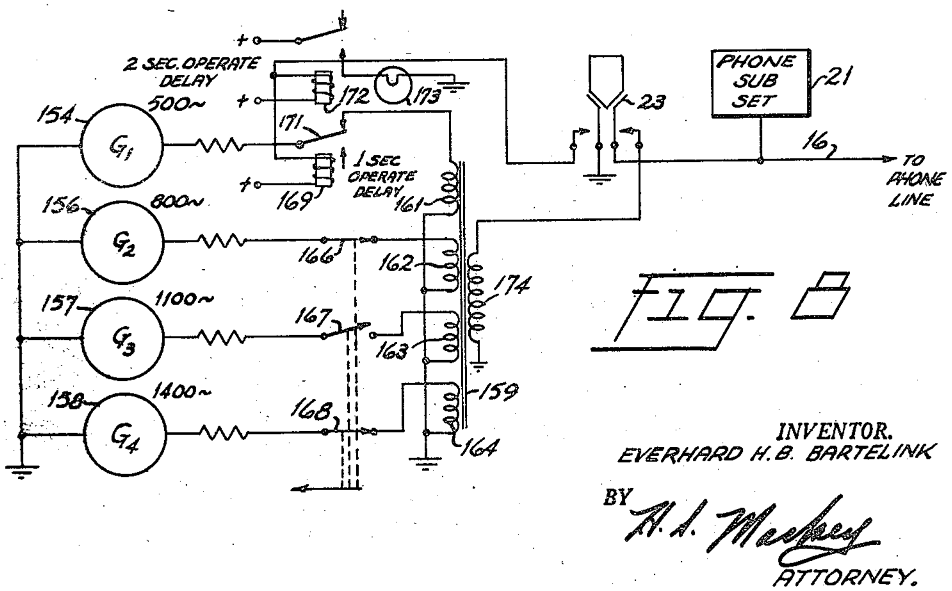
Figure 8 is a schematic diagram of the transmitting switching circuit.

The transmitting switching circuit 18, Fig. 1 and the receiving switching circuit 13 may be connected by any one of numerous signaling systems in order to set the switches 143, 144 and 146, Fig. 8, electromagnetically from a distance. In the telephone art there are numerous systems that may be utilized, such as the several dial telephone switching systems including Strowger, machine switching, cross-bar and electronic. In the telegraph art there are the several printer systems utilizing the Baudot and other codes, notably the start-stop system with tape printer.

As an example of a simple system, two-position relays are employed in the receiving switching circuit 13, Fig. 1, and a number of voice-frequency sinusoidal voltages are generated in the transmitting switching circuit 18. These voltages are transmitted through the telephone central office and are received, amplified and demodulated to direct current at the receiving switching circuit. These demodulated direct currents are employed to operate the two-position relays, and by transmitting only selected ones of the voice-frequency voltages, only the corresponding relays in the receiving switching circuit are operated. As has been mentioned, any number of odd harmonics of 30 cycles can be used in the scrambling and decoding operation, the more used the greater number of code changes are possible. Three two-position relays are required to perform the functions of each of the 5-point tap switches of Fig. 7, and one voice-frequency voltage is required for each relay. A simple code having several possible changes is thus transmitted to set up selected relays and thus to set up corresponding circuits. These circuit are designed to be similar to the circuits of selected positions of the tap switches of Fig. 7, and they complete the secondary coil circuits in the same way as is schematically illustrated in Fig. 7 by the tap switch circuits.

As an example of this decoder system, several voice-frequency generators are indicated in Fig. 8 at 154, 156, 157 and 158. One frequency must be employed for resetting and as stated one frequency is required for each separate receiving relay. However, as the circuits for each group of three setting relays are similar, only four generators are indicated in Fig. 8. Any voice frequencies may be used that can be transmitted through conventional telephone voice circuits, those selected in this example having the frequencies of 500, 800, 110 and 1400 cycles per second. All four generators feed into a single circuit by means of a transformer 159 having multiple primary windings 161, 162, 163 and 164, connected to the outputs of the generators 154, 156, 157 and 158 respectively. Each generator output except that of generator 154 is controlled by a manual switch 166, 167 and 168.

The function of the generator 154 is to provide voltage for resetting all relays at the receiving end, thus wiping out the previous code combination. Therefore the output of this generator is always transmitted and no output switch is required. In order to cut off the resetting voltage after resetting the relays, a relay 169 having, say a 1-second slow operating characteristic is employed, cutting off the resetting voltage by opening contacts 171 after one second. In order to indicate at the transmitting end a reasonable length of time in which to accomplish the resetting of the relays, a 2-second slow-closing relay 172 is connected to operate a lamp 173.

In the operation of this circuit, the transmitting station operator speaks to the individual receiving station operators over the subscriber's sets 19 and 21 and the telephone lines 14 and 16, verifying that the correct subscriber is reached, and then directing him to depress his key 22, Fig. 1. The transmitting operator, having already closed the desired combination of switches 166, 167 and 168, Fig. 8, then closes the switch 23. This disconnects the subscriber's set 21 from line 16 and connects the secondary winding 174, Fig. 8, of transformer 159 to the line 16. The output of generator 154 and the outputs of the selected other generators are sent over the telephone line. After one second the relay 169 operates, opening the output of generator 154. After two seconds the relay 172 operates, lighting lamp 173. When this signal is observed the transmitting operator releases key 23, opening the circuits of lamp 173 and of the transformer 159 and restoring his telephone talking circuit.

Figure 9:
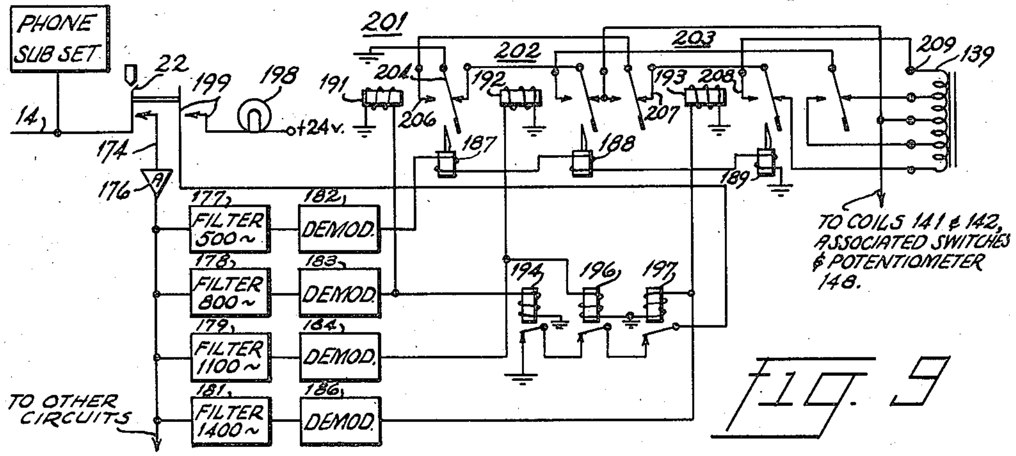
Figure 9 is a schematic diagram of a receiving switching circuit employing relays.

At the receiving switching circuit 13, Fig. 1, a number of two-position relays are employed, 9 being necessary to discharge the functions of the three 5-point tap switches of Fig. 7. These relays are of the latching type and are connected in groups of three. Since the circuits of all groups are similar, only three relays are shown in Fig. 9. The telephone line switch 22, Figs. 1 and 9, has its normally open contact 174 connected through an amplifier 176 to four filters 177, 178, 179 and 181. When the line switches 22 and 23, Fig. 1, are operated, selected generator frequencies are applied to the line and to the four filteres 177, 178, 179 and 181, Fig. 9. These filters are tuned to the four generator frequencies of Fig. 8, 500, 800, 1100 and 1400 C. P. S. and are followed by four demodulators 182, 183, 184 and 186, Fig. 9. The direct current output circuit of the first demodulator 182 is connected to the three relay unlatching coils 187, 188 and 189 in series, so that its output unlatches all relays, permitting them to assume their unoperated positions. The demodulators 183, 184 and 186 are connected respectively to the three relay operating coils 191, 192 and 193. Three signal relays 194, 196 and 197 are connected between the respective demodulator outputs and ground, with their normally closed contacts in series and in series with a signal lamp 198 through normally-open contacts 199 of the switch 22.

On reception of voice frequencies of, say, 500, 800 and 1400 C. P. S., line switch 22 being depressed, the three unlatching coils 187, 188 and 189 are energized, releasing all three relays, and the two operating coils 191 and 193 are energized. The two signal relays 194 and 197 also are operated. The relays 201 and 203 therefore become operated while the relay 202 remains released. At the end of one second the 500 C. P. S. voltage is cut off by the relay 169, Fig. 8, and the unlatching coil energization is therefore cut off. The relays 201 and 203 are accordingly latched closed while relay 202 remains normal. At the end of two seconds the relay 172, Fig. 8 is operated, lighting the signal lamp 173. The transmitting operator, upon seeing this light, releases key 23, removing the code voltages from the line. The relays 194 and 197, Fig. 9, accordingly are released and the circuit of lamp 198 is thereby closed, lighting it and indicating to the receiving operator that the code-setting operation has been completed and that he may release his switch 22.

The relays 201 and 203 having been locked closed, a ground connection is made through the armature 204, fixed contact 206, armature and normal contact 207 of relay 202, armature and operated contact 208 of relay 203, to tap 209 of the secondary coil 139. This coil represents the like numbered secondary coil of Fig. 7. When through similar circuits and components and by like action, taps of the secondary coils 141 and 142 have also been selected, coded combinations of the 30 C. P. S. voltage and of its several harmonic frequencies will have been thereby chosen and combined in the circuit of the potentiometer 148, for the purposes and with the results previously described.

If during a transmission it is desired to reverse the encoding and decoding signals, no effect is produced but in general the signal in unauthorized decoding receivers, on the video signal produced in the described receiver, will become distorted. Such reversal is produced, as before described, by closing the key 72, Fig. 2. The phase of the encoding signal applied to the delay circuit 39 is reversed as is the phase of the 30 C. P. S. signal transmitted through conductors 109 and through the television sound channel to the receiver. These two reversals cancel each other in the described receiver.

Figure 10:
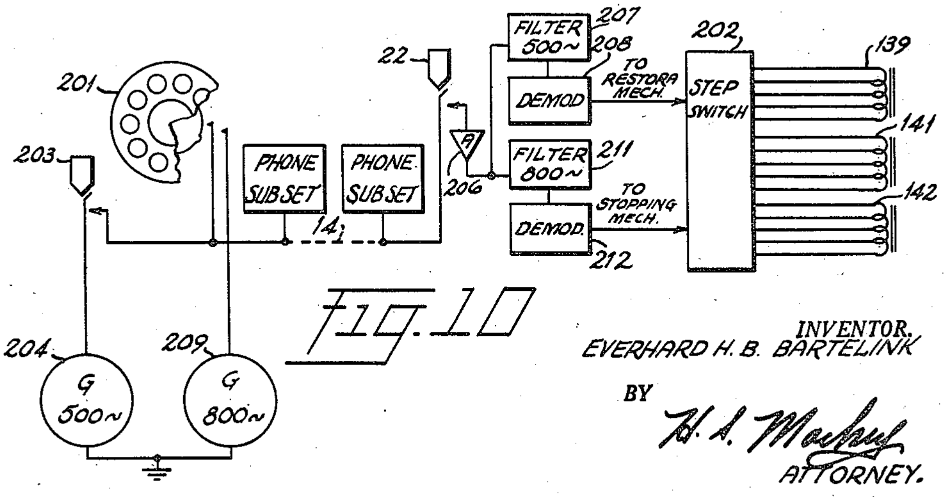
Figure 10 is a schematic diagram showing the use of a step switch in the receiving switching circuit.

As before stated, various coding and decoding systems are available. It was mentioned, for example, that a dialing system could be used, Fig. 10 illustrates the use of such a system in which coded pulses are generated by the operation of a conventional telephone dial 201 to key a tone oscillator 209. The pulses are conventionally received at one or more step switches 202 located at the subscriber's receiving set.

In the operation of such a system the transmitting station operator communicates with the receiving station operator and requests him to close his key 22. The transmitting station operator then closes and opens his momentary release contact push button switch 203, which transmits a 500 C. P. S. tone from generator 204 over line 14, through amplifier 206 to filter 207 and demodulator 208. The demodulated output energizes the restore mechanism of the dial switch 202, restoring its contacts to their zero settings. The transmitting station operator then dials the selected code number, causing pulses of 800 C. P. S. tone from generator 209 to pass into filter 211 and demodulator 212. The output actuates the stepping mechanism of dial switch 202, which thereby through multiple contactors makes the desired connections at the secondary coils 139, 141 and 142 such as are schematically shown by manual switches in Fig. 7.

What is claimed is:

1. A subscriber television system comprising, a television transmitter transmitting a composite television signal including synchronizing signals and interlaced picture field signals, said television transmitter including means for delaying interlaced horizontal scanning lines as respects horizontal synchronizing signals in accordance with a selected harmonic time function of the field frequency, said selected function having a fundamental frequency of one-half said field frequency, means at said transmitter for generating a phasing signal whose frequency is equal to said fundamental frequency, means for modulating said composite television signal by said phasing signal, a television receiver including a picture tube for receiving said delayed horizontal scanning lines and said phasing signal, trigger means at said receiver operated conjointly by said phasing signal and vertical synchronizing signals producing therefrom an output signal synchronized by said vertical synchronizing signals and phased by said phasing signal, decoder means actuated by said trigger means output signal for generating a voltage having a harmonic time function of said field frequency, circuit means for applying said last named voltage to said picture tube to neutralize said horizontal scanning line delay, receiving switching circuit means for adjusting the time function of the voltage generated by said decoding means, a code signal generator positioned at a point remote from said receiver generating selected code signals for controlling and adjusting said receiving switching circuit means, and a line circuit connecting said code signal generator and said receiving switching circuit means for transmitting said selected code signals.

2. A subscriber television as defined in claim 1 including means at said transmitter for reversing the phase of said phasing signal.

References Cited in the file of this patent

UNITED STATES PATENTS

| | | |
|---|---|---|
| 2,545,770 | Ellett | Mar. 10, 1951 |
| 2,551,068 | Striker | May 1, 1951 |
| 2,567,539 | Aram | Sept. 11, 1951 |
| 2,574,462 | Brown | Nov. 13, 1951 |
| 2,612,552 | Crotty | Sept. 30, 1952 |
| 2,619,530 | Roschke | Nov. 25, 1952 |
| 2,673,238 | Druz | Mar. 23, 1954 |
| 2,678,347 | Clothier | May 11, 1954 |